United States Patent
Priednieks

(10) Patent No.: US 7,523,882 B2
(45) Date of Patent: Apr. 28, 2009

(54) REELS, BAIL ARM AND FISHING ROD

(76) Inventor: Olavs Priednieks, Rotas Strasse 14, Jurmala (LV) LV-2010

( * ) Notice: Subject to any disclaimer, the term of this patent is extended or adjusted under 35 U.S.C. 154(b) by 114 days.

(21) Appl. No.: 11/571,307

(22) PCT Filed: Jun. 27, 2005

(86) PCT No.: PCT/LV2005/000007

§ 371 (c)(1),
(2), (4) Date: Dec. 27, 2006

(87) PCT Pub. No.: WO2006/001685

PCT Pub. Date: Jan. 5, 2006

(65) Prior Publication Data

US 2008/0016749 A1    Jan. 24, 2008

(30) Foreign Application Priority Data

Jun. 29, 2004    (EP)    .................................. 04015276

(51) Int. Cl.
*A01K 89/01*    (2006.01)
(52) U.S. Cl. ........................ 242/224; 242/305; 242/231; 242/323
(58) Field of Classification Search ................. 242/223, 242/224, 305, 230, 231, 323, 319; 33/708, 33/716
See application file for complete search history.

(56) References Cited

U.S. PATENT DOCUMENTS

| | | | | |
|---|---|---|---|---|
| 2,712,908 | A | * | 7/1955 | Kozminski ............... 242/396.7 |
| 4,650,161 | A | * | 3/1987 | Kaneko ...................... 242/224 |
| 5,131,165 | A | * | 7/1992 | Benson ........................ 33/719 |
| 5,503,341 | A | | 4/1996 | Kaneko et al. |
| 5,524,831 | A | | 6/1996 | Carlson et al. |
| 5,645,237 | A | * | 7/1997 | Kaneko ...................... 242/224 |
| 2004/0056131 | A1 | * | 3/2004 | Stiner et al. ................. 242/223 |
| 2008/0016749 | A1 | * | 1/2008 | Priednieks ...................... 43/20 |

FOREIGN PATENT DOCUMENTS

| | | |
|---|---|---|
| JP | 10174537 A | 9/1998 |
| WO | WO9802037 A1 | 1/1998 |
| WO | WO0076311 A1 | 12/2000 |

* cited by examiner

*Primary Examiner*—Emmanuel M Marcelo
(74) *Attorney, Agent, or Firm*—AKC Patents LLC; Aliki K. Collins

(57) ABSTRACT

This invention concerns a fishing rod which comprises an accelerometer (4) for measuring the acceleration of the fishing rod. Moreover the invention provides a reel (12, 20) for a fishing rod which comprises a member (28) which is moved at each cast of a fishing line. The reel further comprises a sensor for detecting the movement of the member. Further, the invention discloses a reel for a fishing rod which comprises a member (23, 28) which rotates when a fishing line is retrieved. An electrical sensor (24, 25, 37, 38) detects the rotation of the member. Finally the invention concerns bail arms (28).

8 Claims, 8 Drawing Sheets

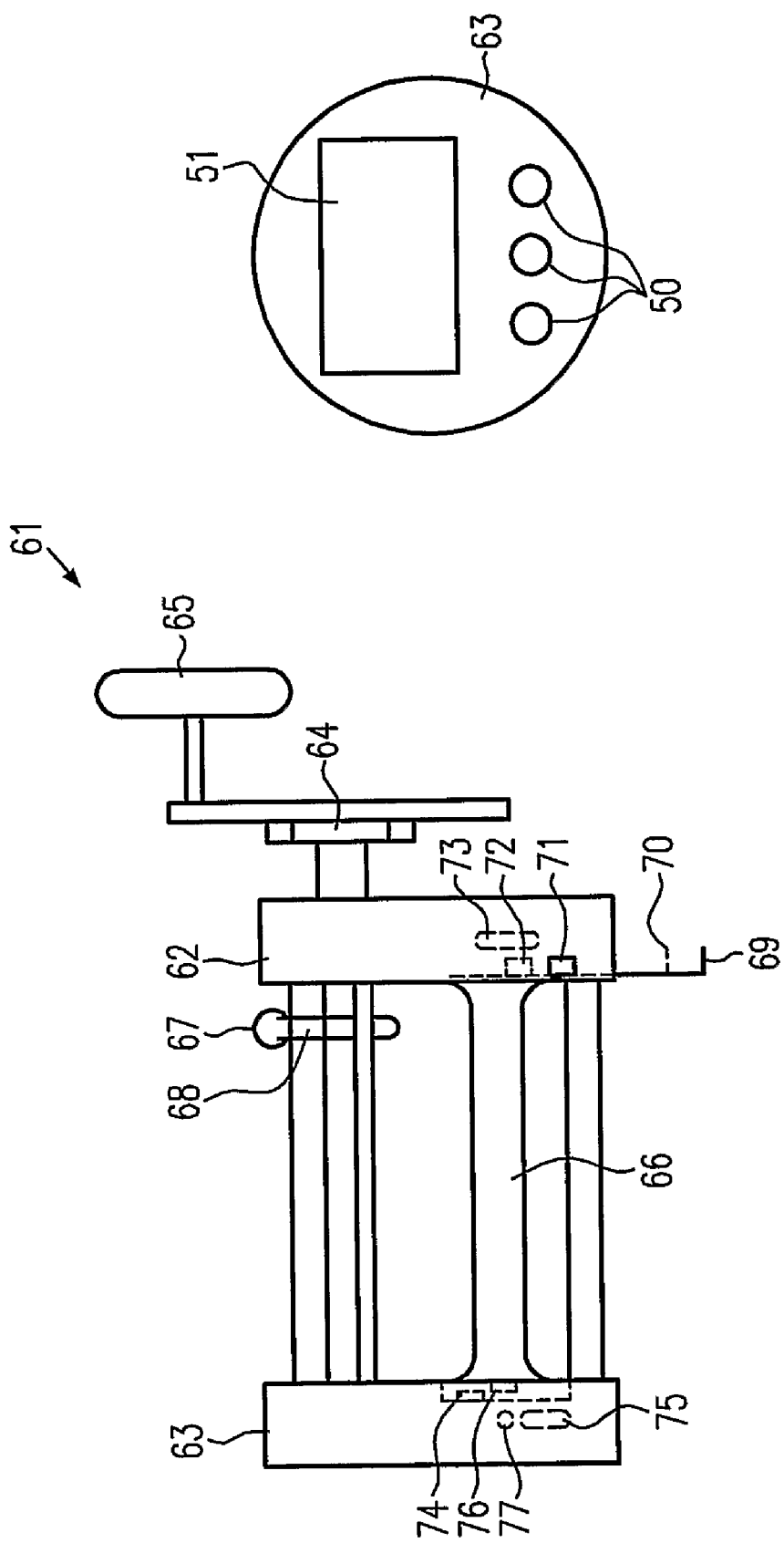

REELS, BAIL ARM AND FISHING ROD

The present invention pertains to a fishing rod various reels and bail arms. More specifically, the invention relates to the field of fishing equipment which allows fishermen more easily to determine the success of fishing sessions by counting for example the number of casts or determine the length of the cast or retrieved fishing line.

Fishing rods and reels according to the preamble parts of the independent claims are well-known in the art.

The U.S. Pat. No. 5,321,391 (granted as U.S. Pat. No. 6,708,441) describes a fish-bite indicator which comprises a housing having an external screw-threaded metal shank extending downwardly from its underside. The upper end of the housing is bifurcated, so that it has two generally upwardly extending prongs, at the upper end of the left hand of which there is provided a light emitting diode LED. A slot extends downwardly from the base of the bifurcation to expose a central portion of a rotary part contained within the housing. This central part is formed with a waist, so that it has the form of a pulley-wheel. When the fish-bite indicator is installed for use, the shank is screwed into an internally screw-threaded portion at the top of a bank stick so that the prongs project upwardly. A portion of a fishing rod is then seated in the bifurcation, and the line of the fishing rod passes through the slot so that it rests with tension on the rotary part.

An inner wall is formed in the housing and generally surrounds the slot to form an enclosure which contains the rotary part which has a tapering spindle portion extending in an intended horizontal direction away from the central portion. A second spindle portion of the rotary part extends outwardly away from the central portion in the opposite direction to that of the spindle portion. Four cylindrical blocks extend radially outwardly from the rotary axis of the rotary part, spaced apart at 90° intervals therearound, and house respective permanent magnets. A printed circuit board is fixed to the interior of the housing. A reed switch is mounted on the circuit board immediately adjacent to the bottom of the inner wall, within range of the magnetic fields of the permanent magnets as the latter pass by the bottom when the rotary part rotates.

Movement of the line resulting from a fish-bite will then rotate the rotary part so that the reed switch is switched on every time one of the four magnets passes close to it. The resulting electrical pulses generated by the reed switch are passed to a counter, which in turn passes a square-wave pulse to the LED and also to the gated oscillator. In a first, most sensitive setting of the sensitivity control, an output pulse will be generated by the counter to pass to the gated oscillator every time the counter receives a signal from the reed switch. In a second rotary setting of the sensitivity control knob, the counter will only issue a pulse to the gated oscillator every time it completes a count of two signals from the reed switch. In a further rotary setting, the count needed for the counter to issue a signal is four, in a further setting it is eight, and so on. As a result, therefore, the distance of movement of the line along its length, to cause the counter to issue a square-wave pulse, will vary according to the setting of the sensitivity control knob. For example, the minimum detectable movement might be as little as 45 mm (3/16 inch), or as much as 762 mm (3 inches).

The magnets and reed switch could be replaced by a photo-emitter pair, the radiation path between which is alternately made and broken by a rotary part, or by a rotary wheel attached thereto. The different settings of the sensitivity switch described herein may be obtained with different "click" positions of the knob.

The U.S. patent application publication 2003/0089020 A1 describes a fish bite detector which includes a transmitting device and a box including a receiving device. The transmitting device is attached to a fishing pole and fishing line shown in broken lines. The transmitting device also functions as a sensing device for movements in the fishing line. The device has an actuating arm which is attached to the fishing line by a V-shaped hook and to the main body by insertion into a socket. A sensing pole rises from the main body, and has a V-shaped notch on its upper surface in which the actuating arm rests. Movement on the fishing line is transmitted through the actuating arm and the sensing pole to a piezoelectric crystal in the main body.

The receiving box comprises a buzzer and a vibrator. The buzzer may emit an audible sound and the vibrator may vibrate when movement is detected on the fishing line.

In accordance with the disclosure of US 2003/0089020 A1, instead of a piezoelectric crystal to detect changes in the tension in the line, other kinds of sensing devices can be used, including a pendulum, a photo sensor, a pressure sensor, a mercury tilt switch sensor, a multi-position array of sensors, including a pendulum and arrays of infrared emitting and detecting diodes, that can detect a wide range of angle changes, a magnetic reed switch sensor or a tension sensor.

Various other fish bite indicators are known in the art. According to the disclosure of U.S. Pat. No. 6,568,121 a fish bite indicating apparatus detects movement of the fishing line when a fish bites on a lure. U.S. Pat. No. 5,881,488 discloses a fish bite detector assembly comprising a magnetically controlled switch for detecting a fish bite. A compression clip operably connected to the magnet, grasps the fishing line forming an integral link between the magnet and fish road. A bite of the hook causes the magnets to move away from the switch, thus, closing the switch contacts. The assembly operates as a force detector for a fishing line. The fish strike detector described in U.S. Pat. No. 6,035,573 detects the bending of the fishing rod when a fish strike occurs.

Reed switches are sold by ALEPH INTERNATIONAL CORPORATION (www.aleph-usa.com). A reed switch consists of a pair of flexible reeds made of a magnetic material and sealed in a glass tube filled with indirect gas. Application of a magnetic field causes both reeds to the magnetized. If the magnetic field is strong enough both reeds touch each other and close an electric circuit.

It is the object of this invention to provide a fishing rod, reels and bail arms which allow fishermen to evaluate the fishing in a new way.

This object is achieved by the subject matter of the independent claims.

Preferred embodiments of the invention are the subject matters of the dependent claims.

An accelerometer fixed to a fishing rod detects castings.

An accelerometer which comprises a spring, a magnet and a reed switch can be used in harsh environment. Moreover the electrical signal provided by a reed switch can be easily counted without using sophisticated circuitry like amplifiers etc.

Some kinds of reels comprise members like buttons or clutches which are operated each time the fishing line is cast. Advantageously also the movement of these members can be detected and counted.

More information can be obtained from members that rotate when the fishing line is retrieved. In some kinds of reels of these members also rotate when the fishing line is cast. By detecting the rotation of these members the length of the retrieved line can be determined. Provided that the line is not ripped off, the length of the cast line is equivalent to the length of the retrieved line.

A microprocessor can be advantageously used for counting of castings or rotations of members. Moreover more sophisticated evaluations can be easily programmed.

The recording of the date and time of a fishing session together with its parameters helps to identify previous fishing sessions and to compare the success of different fishing sessions.

In the following preferred embodiments of this invention are described referring to the accompanying drawings. In the drawings:

FIG. 5 shows a multiplier reel which comprises a fishing counter;

FIG. 6 shows a side view of the multiplier reel;

Figure 1:
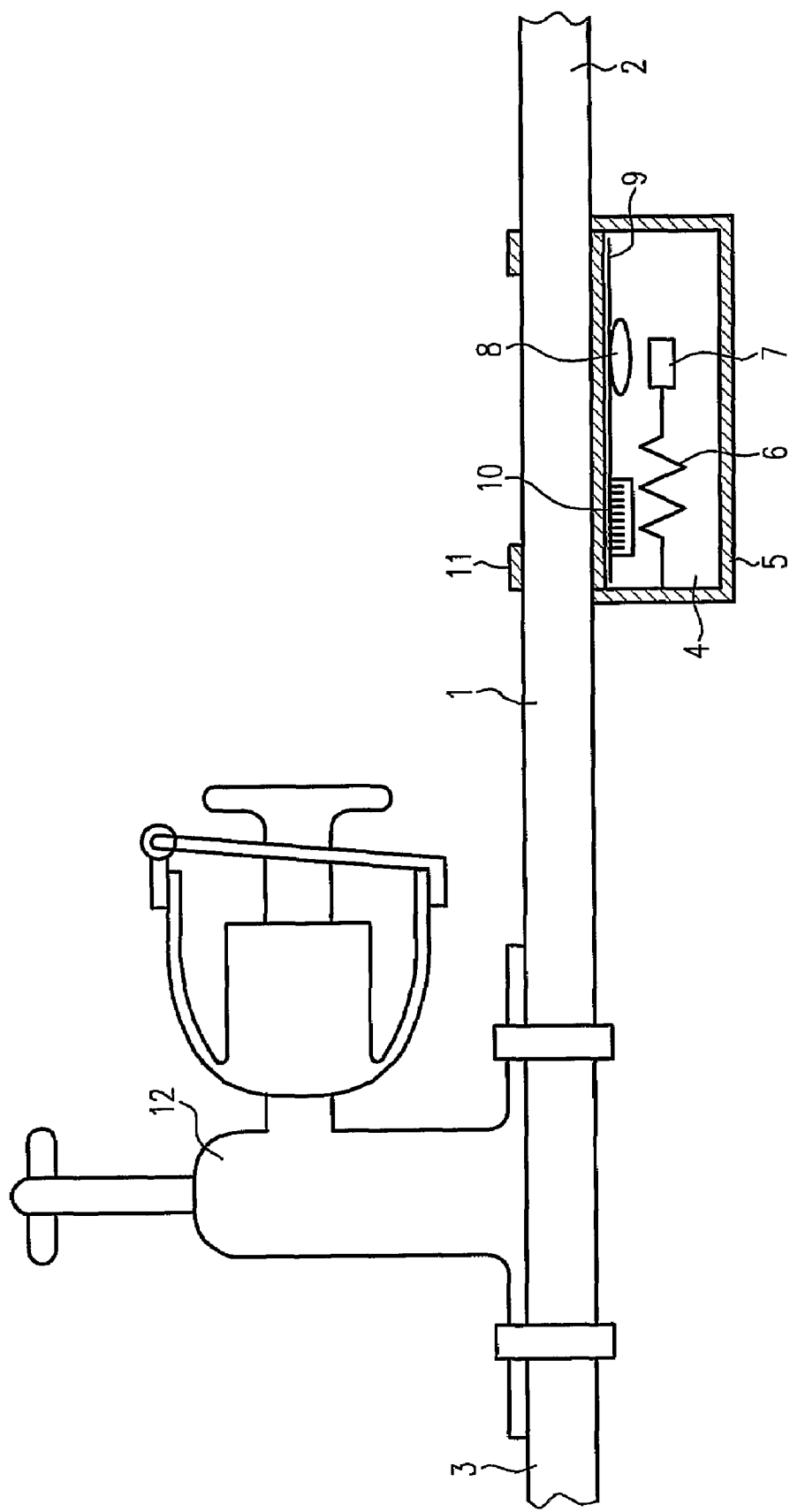
FIG. 1 shows a fishing rod to which a fishing counter is attached.

FIG. 1 shows a fishing counter 4 attached to a fishing rod 1. Fishing rod 1 comprises a pole portion 2 and a handle portion 3. A reel 12 is fixed to fishing rod 1 close to handle portion 3. Fishing counter 4 is attached to fishing rod 1 by fastening 11. Fishing counter 4 comprises a housing 5, a spring 6, a magnet 7, a reed switch 8, a printed circuit board 9 and a microprocessor 10. Fishing counter 4 comprises a display 51 and buttons 50 which are, however, not shown in FIG. 1.

One end of spring 6 is fixed to housing 5. Magnet 7 is attached to the other end of spring 6. Printed circuit board 9 carries reed switch 8 and microprocessor 10. Printed circuit board 9 further comprises necessary circuitry and may comprise a battery which is not shown in the figures for powering the circuitry.

During casting fishing counter 4 is accelerated. The inertia of magnet 7 moves the magnet away from or closer to reed switch 8. This opens or closes a reed switch 8. The electrical pulses generated by reed switch 8 are counted and further processed by microprocessor 10. It depends on the orientation of fishing counter 4 relative to fishing rod 1 as to whether magnet 7 moves away from or closer to reed switch 8 during casting. A normally-open configuration in which the magnet moves closer to reed switch 8 during casting, which causes reed switch 8 to close during casting, results in a lower power consumption because a test current for determining the status of reed switch 8 flows only during casting.

Although the embodiment shown in FIG. 1 may give the impression of a rough-and-ready embodiment, more professional embodiments are conceivable. In an embodiment which is more ready for industrial production, fishing counter 4 may be shrunk and integrated into fishing rod 1 or reel 12. Embodiments in which fishing counter 4 is integrated into reel 12 may look similar to the embodiments shown in FIGS. 2, 3, 4 and 6.

It should be noted that during casting the whole fishing rod and in particular the handle portion experiences a high acceleration. During a fish bite the fishing rod end is slightly moved by the line and consequently accelerated, whereas the handle portion remains at rest.

The processing of microprocessor 10 will be explained in more detail in connection with FIGS. 8 to 11.

Figure 2:
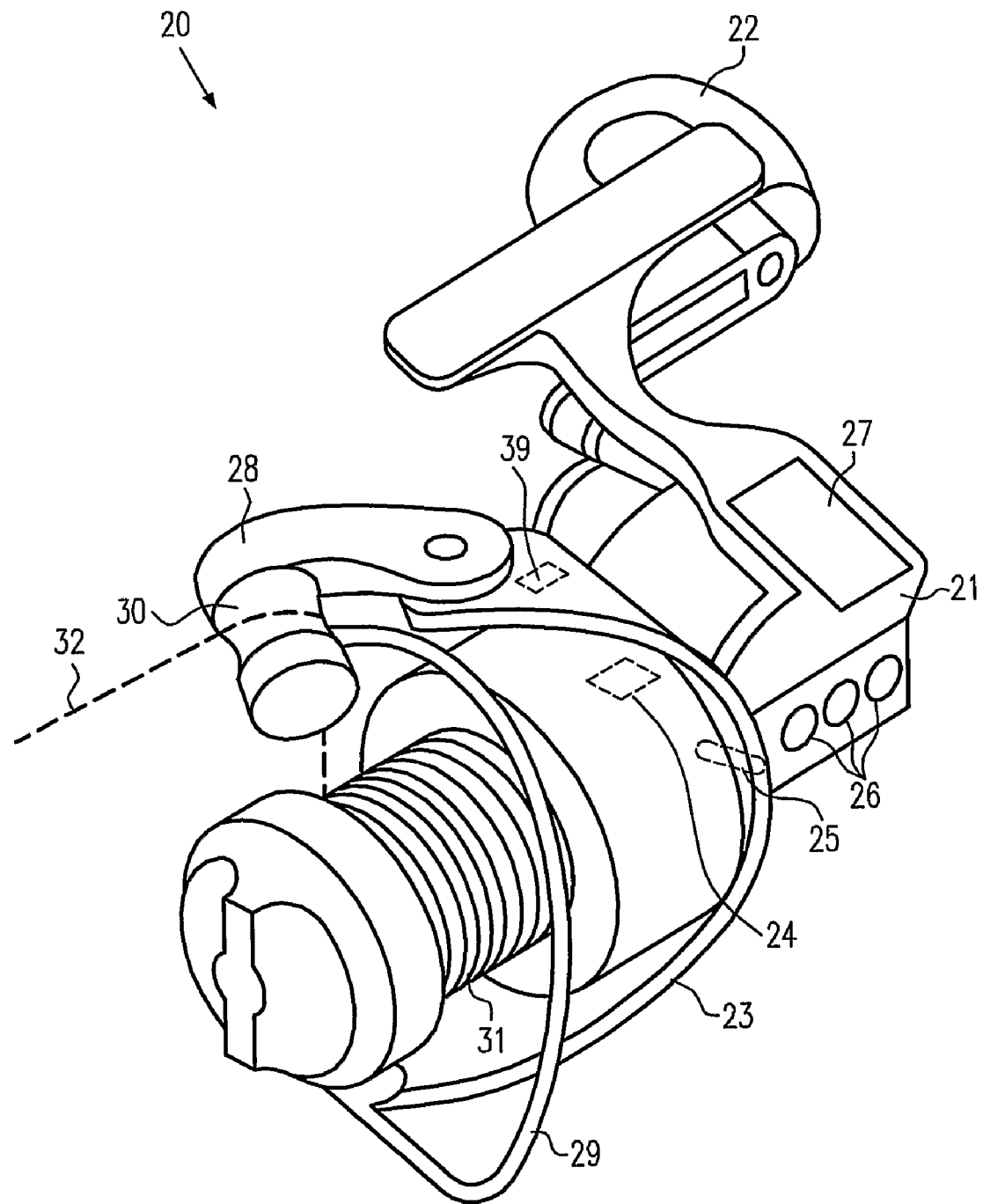
FIG. 2 shows a fixed-spool reel which comprises a fishing counter.

FIG. 2 shows a fixed-spool reel 20 which comprises a body 21, a padded handle 22, a rotor 23, a magnet 24, a reed switch 25, buttons 26, a display 27, a bail arm 28, a bail 29, a line roller 30 and a fixed spool 31. When casting, bail 29 and bail arm 28 are flicked back to allow line to flow off spool 31. Bail 29 and bail arm 28 flip back when the reel handle is wound forwards. Spool 31 is able to rotate under tension from a slipping clutch to give line to a running fish.

Reed switch 25 is mounted within body 21. Magnet 24 is mounted within rotor 23. When rotor 23 turns in order to retrieve fishing line 32, reed switch 25 closes when magnet 24 passes by. These pulses are counted and processed by a microprocessor which is not shown in FIG. 2. The microprocessor can be controlled by buttons 26 and displays processed values in display 27 which will be explained in more detail in connection with FIGS. 8 to 11.

Since rotor 23 only turns during the line retrieve, but not during casting or when a fish wants to take line, strictly speaking only the length of the retrieved line can be measured. Provided that the line is not ripped off, the length of the cast line is equivalent to the length of the retrieved line. The length of the retrieved line is approximately proportional to the rotations of rotor 23. In order to increase accuracy it can be taken into account that the effective diameter of fixed spool 31 increases the more line is retrieved. This square component can be easily allowed for by the microprocessor. The effective diameter $r_{eff}$ of fixed spool 31 can be calculated by allowing for the diameter of the line. More specifically the effective diameter can be calculated by formula (1):

$$r_{eff} = r_{min} + C\frac{r_l^2}{w}n \qquad (1)$$

In this formula $r_{min}$ stands for the minimum diameter of the spool without line, w is the width of the spool, $r_l$ is the diameter of the line, C is a constant close to 1 and n is the number of windings on the spool. Constant C depends on the exact way of winding and may be found by experiments.

$$l = 2\pi\left\{\left(r_{min} + C\frac{r_l^2}{w}n_0\right)n_0 - \left(r_{min} + C\frac{r_l^2}{w}n\right)n\right\} = \qquad (2)$$
$$l_0 + l_1(n_0 - n) + l_2(n_0 - n)^2$$

The length l of the retrieved line may be calculated from equation (2). $n_0$ designates the windings after a complete retrieval of the line and n designates the windings before the retrieval. This means that $n_0-n$ designates the number of rotations during retrieval. The right-hand side of equation (2) shows that the equation may be simplified to a square dependence in which $l_1$ and $l_2$ are constants that may be found by experiments. $l_0$ should be 0.

It should be noted that all electrical components including a battery, which is not shown in FIG. 2, are comprised in body 21. Consequently no connections between moving parts are required. This ensures reliability and keeps production costs within a reasonable limit.

Figure 3:
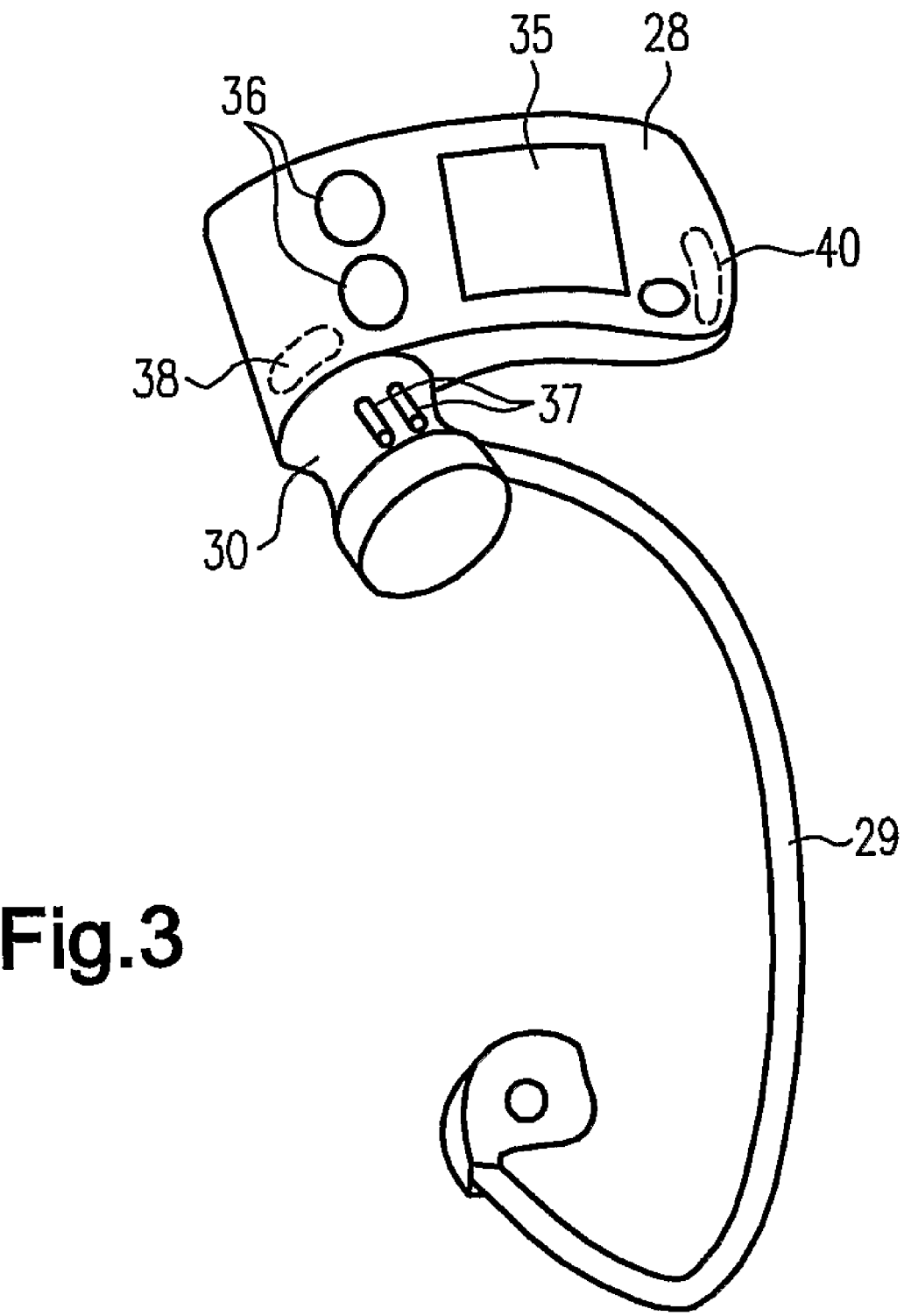
FIG. 3 shows a bail arm which comprises a fishing counter.

FIG. 3 shows an embodiment in which the fishing counter is integrated into bail arm 28. The operating principle is similar to the one of the embodiment shown in FIG. 2. Bail arm 28 shown in FIG. 3 is broader than bail arm 28 shown in FIG. 2 in order to accommodate display 35 and buttons 26, a battery, a microprocessor and other circuitry required. Also in this embodiment all electrical components are comprised in bail arm 28 and no connections between moving parts are required. Magnets 37 are integrated into line roller 30. This embodiment has the advantage that the diameter of line roller 30 remains constant. Therefore the number of revolutions of line roller 30 and consequently the number of pulses counted by the microprocessor is proportional to the line retrieved.

Also in this embodiment the length of the line cast cannot be determined, since bail 29 and bail arm 28 flip back during casting. However, when giving line to a running fish, bail 29 and bail arm 28 do not flip back. Rather, line roller 30 rotates in the opposite direction then during line retrieve and reed switch 38 generates pulses. In order to determine the direction of rotation two magnets 37 are provided. Both magnets have a different axial distance from reed switch 38 in order to generate pulses of a different length. In another embodiment both magnets may have different strength in order to generate different pulses. In a further embodiment only one magnet together with two reed switches may be provided in order to determine the direction of rotation. The two magnets or the two reed switches include an angle different from 180° relative to the rotation axis of line roller 30. By distinguishing between phases when line is retrieved and phases when line is given to a running fish the length of the cast line can be calculated by a microprocessor.

In addition a reed switch 40 and a magnet 39 may be provided in bail arm 28 and rotor 23, respectively. This reed-switch-magnet pair may detect the flip-backs of bail arm 28 and thereby detect the number of casts which may be displayed in display 35. As mentioned above bail arm 28 flips back each time the line is cast. Reed switch 40 and magnet 39 may be provided in addition or alternatively to magnets 37 and reed switch 38. In any case the electronics, the reed switches, the buttons and the display are comprised within bail arm 28. This avoids connections between members that move with respect to each other during operation. Such moving connections are error-prone.

In another embodiment magnet 39 is comprised in bail arm 28 or in bail 29 close to the joints with rotor 23, whereas reed switch 40, display 35, buttons 35 and the electronics is positioned in rotor 23. Further, the mechanism for effecting the flip-back of the bail arm in the interior of the reel comprises many members which are moved once per line cast. The movement of each of these members could be detected by a suitable sensor, e. g. reed-switch-magnet pair or a light barrier.

An additional reed-switch-magnet pair like magnet 24 and reed switch 25 could be provided in order to detect the rotations of the rotor for determining the length of the cast line. In order to avoid moving connections, the reed switch of the additional reed-switch-magnet pair is positioned in the rotor, whereas the magnet is positioned in spool 24 or body 21. The rotor provides more space for additional elements than the bail arm.

In an other version reed switch 40, display 35, buttons 35 are positioned in the body 21 and magnet 39 is positioned in the mechanism for effecting the flip-back of the bail arm 28 in the interior of rotor 23 and comprises many members which are moved once per line cast. This version allows also to register the movements of the rotor when the line will be retrieved when another reed-switch is placed in the body 21 and an other magnet is placed in the rotor.

Figure 4:
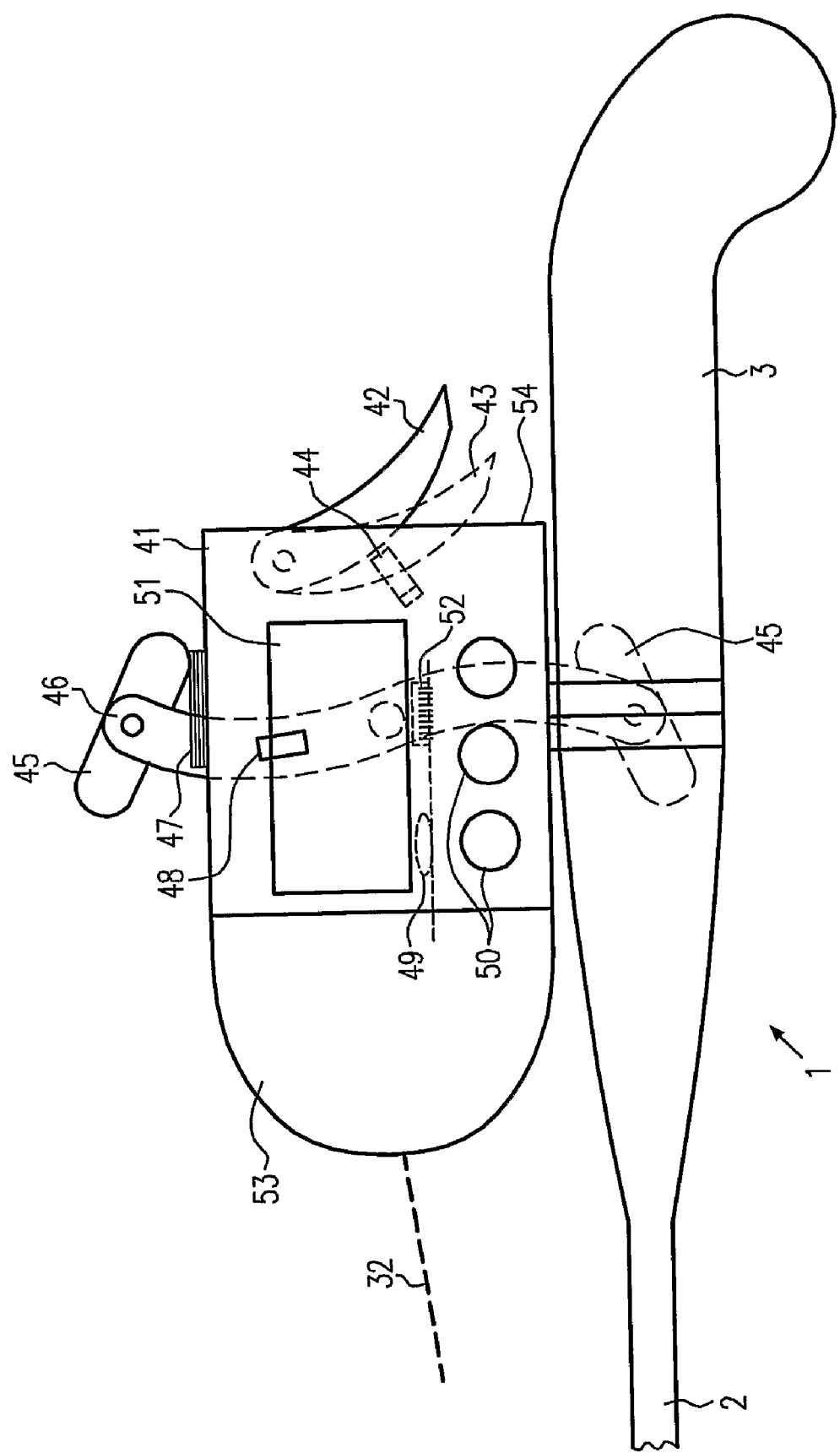
FIG. 4 shows a closed-face reel which comprises a fishing counter.

FIG. 4 shows a closed-face reel 41 with a fishing counter. Closed-face reel 41 is mounted on a fishing rod 1 which has a pole portion 2 and a handle portion 3. Closed-face reel 41 comprises a thumb button 42 for disengaging the fishing line 32 for casting. This means that thumb button 42 is pressed one time for each cast. Reference numeral 43 designates the thumb button in the depressed position. Depressing of thumb button 42 is detected by light barrier 44.

Closed-face reel 41 further comprises a crank arm 46 with padded handles 45 for retrieving fishing line 32. Each rotation of crank arm 46 is detected by reed switch 49 which is closed when magnet 48 moves by. Microprocessor 52 counts the times reed switch 49 is closed and the times light barrier 44 is interrupted. As will be described below, display 51 may display the values counted by microprocessor 52 or values derived therefrom like the length of the retrieved line. The operation of microprocessor 52 can be controlled by buttons 50 as will be described below. Similarly to a fixed-spool reel 20, the length of the retrieved line is not exactly proportional to the number of rotations of crank arm 46. On the other hand, microprocessor 52 can easily allow for this small non-linearity.

In another embodiment a magnet and a reed switch or a light barrier may be positioned within closed-face reel 41 in order to detect the number of rotations of the spool within closed-face reel 41.

In another kind of closed-face reels the line is released by moving the front cone 53 backwards to casing 54 thereby moving some bolts within casing 54. In this kind of closed-face reel a magnet may be fixed to front cone 53 or a bolt moved by front cone 53. Alternatively, a bolt itself may be made of magnetic material. The reed switch is mounted within casing 54 close to the magnet or magnetic material so that the movement of front cone 53 indirectly opens or closes the reed switch. Under the assumption that front cone 53 is moved at each cast, each pulse generated by the reed switch corresponds to one cast.

FIG. 5 is a bottom view of a multiplier reel 61. Multiplier reel 61 comprises a spool 66 between a left-side housing 63 and a right-side housing 62. Padded handle 65 drives a crank in order to turn spool 66 for line retrieve. Also a drag adjustment handle 64 is provided. A clutch 69 releases spool 66 for casting when clutch 69 is in a depressed position 70. As soon as the crank is turned by padded handle in order to retrieve line, clutch 69 automatically jumps out again.

In a similar way, as explained in connection with FIG. 4, the number of casts may be determined by counting how many times clutch 69 is depressed. To this end a clutch magnet 71 and a clutch reed switch 73 are provided wherein reference numeral 72 designates the position of the clutch magnet when the clutch is in a depressed position.

The rotation of spool 66 may be detected by spool magnet 74 and spool reed switch 75. As explained above the length of the retrieved line may be calculated by microprocessor by counting pulses generated by spool reed switch 75. In a simple embodiment it may be assumed that line is retrieved while clutch 69 is in a non-depressed position.

As explained in connection with line roller 30 shown in FIG. 3, a second spool magnet 76 and/or a second spool reed switch 77 may be provided in order to detect the direction of rotation of spool 66. Then, in contrast to the embodiments which comprise a fixed-spool reel, it is possible also to calculate the length of the fishing line cast from the number of rotations of spool 66 during casting. Playing with a fish may be monitored more closely by registering periods while the fish takes line and periods while line is partly retrieved. A microprocessor may register the duration of such periods and also the time-dependent speed of giving or retrieving line.

If the direction of rotation of spool 66 is monitored, the microprocessor may detect if the fishing line is ripped off by comparing the length of the line cast with the length of the line retrieved. If the total length of the line cast plus the total line given while playing with a fish is substantially shorter than the total length of the line retrieved while playing with a fish and the final retrieval, then the fishing line is ripped off. Such a ripping off may be caused by lost fish or if the fishing hook or lure gets shut in wood.

FIG. 6 shows a side view of multiplier reel 61, more specifically left-side housing 63. Left-side housing 63 comprises display 51 and buttons 50.

Figure 7:
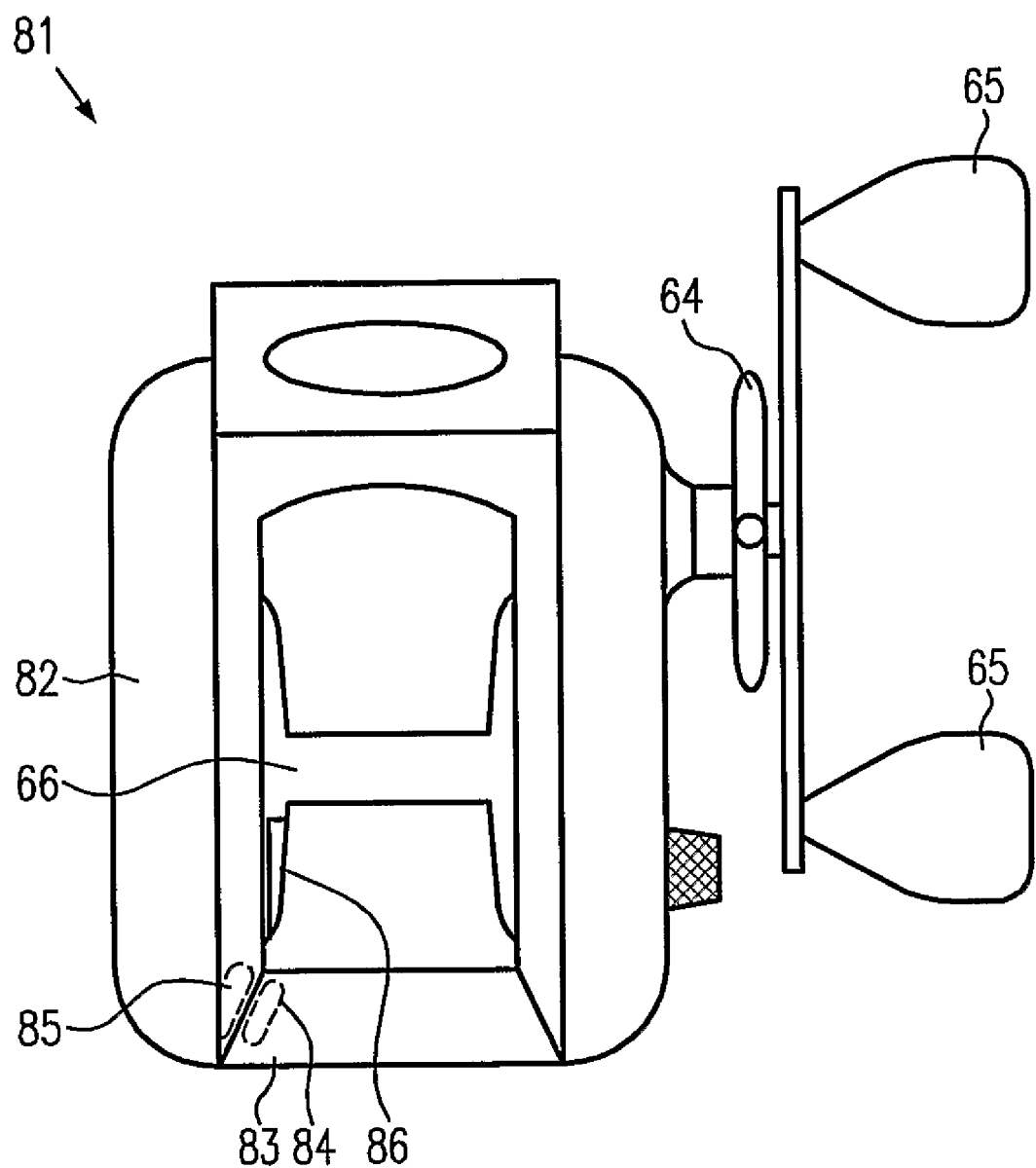
FIG. 7 shows a baitcasting reel which comprises a fishing counter.

FIG. 7 shows a baitcasting reel 81. Baitcasting reel 81 is similar to a multiplier reel 61. However, baitcasting reel 81 comprises a thumb bar 83 instead of a clutch 69. The thumb bar 83 is depressed while casting. This movement can be detected by magnet 84 and reed switch 85. The rotation of spool 66 may be detected in the same way as explained in connection with multiplier reel 61. Left-side plate 82 may comprise a display and buttons.

The accuracy of all embodiments in which the revolution of rotating parts is measured by a combination of a reed switch and a magnet can be increased by using two or more magnets instead of just one (for example FIG. 2) or two (for example FIG. 3). By using a plurality of magnets and/or reed switches fractions of rotations may be detected.

Instead of a magnet-reed-switch pair light barriers may be used and vice versa. The passing by of a magnet may also be detected by observing the voltage induced in a coil.

Alternatively or in addition to magnet-reed-switch or photo-emitter pairs an array of photo detectors may be used as shown in FIG. 7 exemplarily. More specifically a one-dimensional CCD (charge coupled device) array 86 may be mounted on spool 66. The wound up line covers the inner part of the spool which is therefore dark. The outer part of both, the spool and the CCD array are enlightened. The electronics for controlling and reading out a CCD array are well known in the art.

In an alternate embodiment spool 66 may be at least partly transparent. The CCD array itself may be mounted within the housing below left-side plate 82. The transparent part of spool 66 may extend radially from the axis of spool 66 and may have the shape of a cylindrical lens for focusing incident light onto the CCD array.

In both embodiments the length of the wound up line can be determined from the enlightened part of the CCD array by using a square dependence similar to the right-hand-side of equation (2). Since the length of the wound up line can be directly determined, these embodiments do not give false line lengths even if a part of the line is ripped off, rather, even the length of the ripped-off line can be determined after the rest of the line is retrieved. Further, is not necessary to enter the total length of the line.

FIGS. 8 to 11 show different views of information provided and stored in microprocessor 10 or 52.

Figure 8:
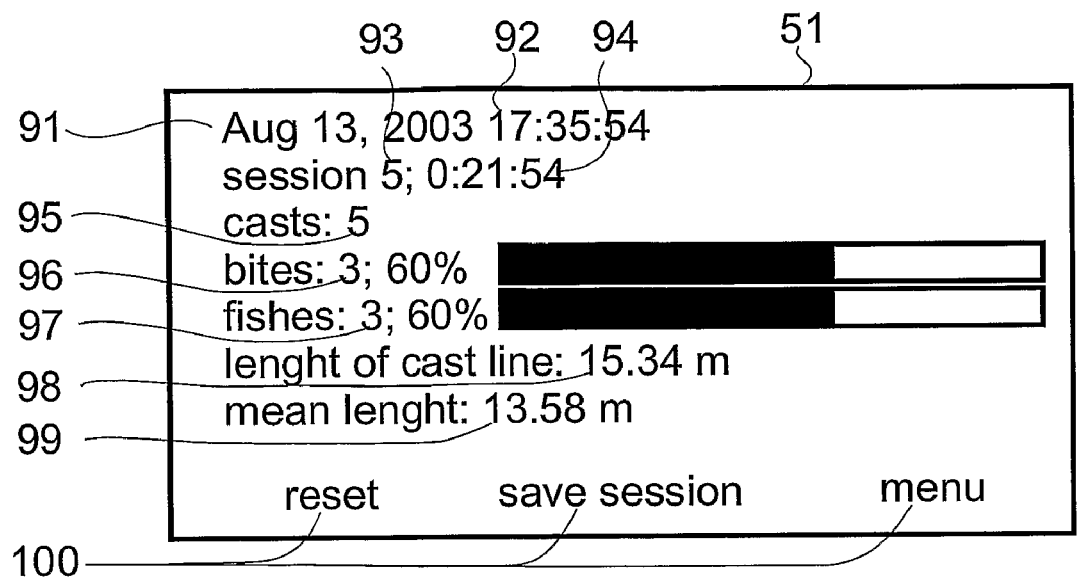
FIG. 8 to FIG. 11 show different views on a display of a fishing counter.

FIG. 8 shows a view of a fishing session. This view comprises the present date 91, the present time 92, the number of the present session 93, the duration of the present session up to now 94, the number of casts 95, the number of fish bites during the present session 96, the number of fishes caught during the present session 97, the length of the cast line 98 and a mean length of the cast line during the present session 99. The percentage of successful casts (60%) is also given. The percentage may be visualized by bars. The difference between the number of fish bites and the number of fishes caught is the number of lost fishes. In the example session 5, shown in FIG. 8, no fish has been lost. As mentioned above a ripped off fishing line or hook may be detected by comparing the length of the line cast with the length of the line retrieved. In embodiments in which the length of the line cast cannot be directly measured, the number of line rip-offs may be entered by buttons 50. In addition or alternatively the number of caught fishes may be entered by buttons 50.

The view shown in FIG. 8 further comprises menu 100. Menu 100 provides the three options "reset", "safe session" and "menu" and associates each of the three options with one of buttons 50. Depressing of the left button 50 which is equivalent to selecting the option "reset", deletes all information collected during the present session and restarts this session. The option "safe session", which is equivalent to depressing the middle button, saves the information collected during the present session 5 and starts a new session 6 in the example shown in FIG. 8. The option "menu" displays a menu view shown in FIG. 9.

Other embodiments may provide similar views showing only a subselection of the information provided in FIG. 8 and/or may display additional information.

Figure 9:
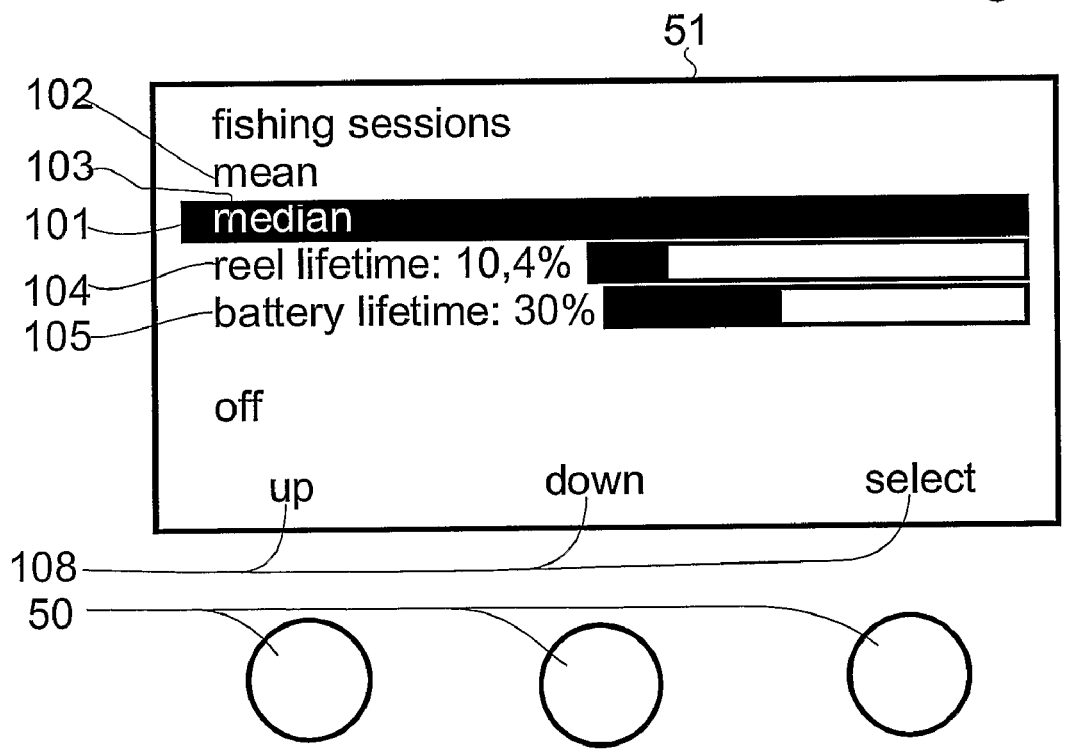
Figure 10:
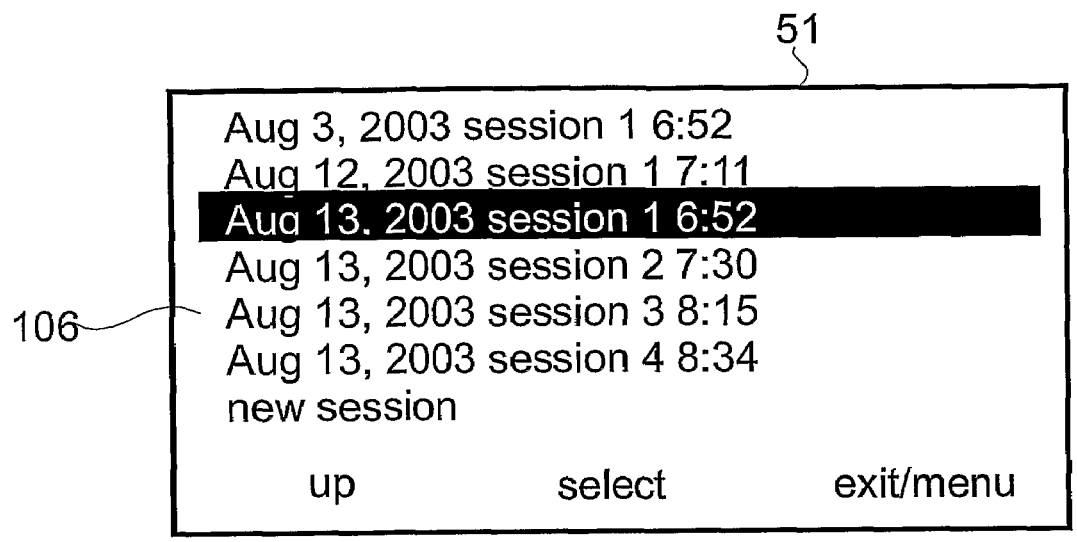
Figure 11:
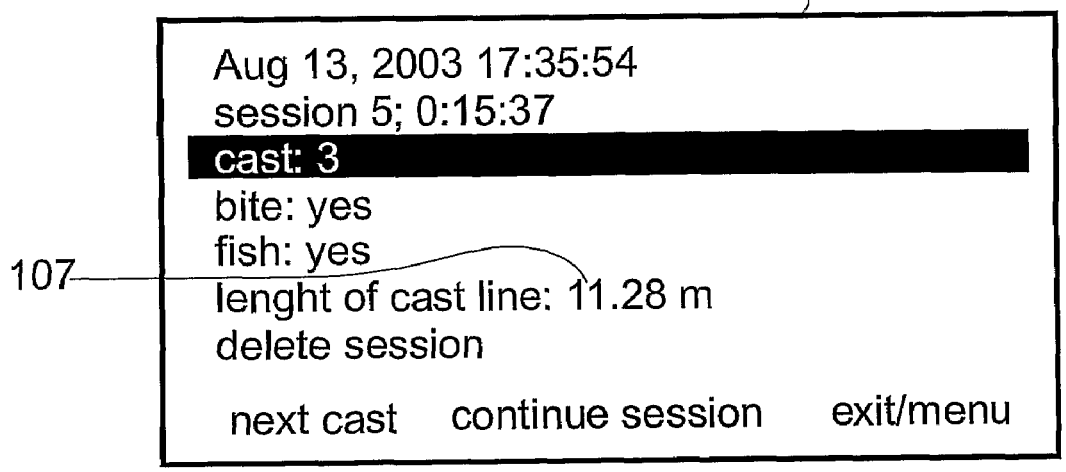

FIG. 9 shows a so-called menu view. This view comprises control options and system information. A cursor line 103 may be moved from control option to control option by depressing the left or the middle button. As indicated in menu 108 depressing the left button moves cursor line 103 up whereas depressing the middle button moves cursor line 103 down to the next control option. By depressing the right, "select" button a control option is selected. If the control option "fishing sessions" is selected, a previous session view as shown in FIG. 10 is displayed. Selecting the "mean" option 102 causes the microprocessor to display a mean length of the cast line as shown in FIG. 8. Selecting the "median" option 103 causes the microprocessor to display a median length of the cast line instead of a mean length. Reference numerals 104 and 105 refer to system information, more specifically the reel lifetime and the battery lifetime, respectively. The reel lifetime may be calculated from the total number of casts and/or the sum of the lengths of cast or retrieved line of all casts made by a reel. The manufacturer may guarantee the lifetime of a reel or fishing rod in terms of total number of casts and/or the sum of the lengths of cast or retrieved line of all casts made by a reel.

The "off" option switches of the fishing counter. It may be switched on again by depressing one button or—in order to avoid unintentionally switching on the fishing counter—by simultaneously depressing two buttons for a predetermined time of for example one second.

By the view shown in FIG. 10 previous fishing sessions may be selected for display. The previous session view 106 shown in FIG. 10 displays the date, the session number and the starting time of previous fishing sessions. The lowest option "new session" starts a new session thereby switching to a fishing view as shown in FIG. 8. As explained above, depressing the left button moves the cursor line up. Depressing the middle button selects the option marked by the cursor line. Depressing the right button causes the microprocessor to display a menu view as shown in FIG. 9.

If a previous session is selected from previous session view 106 shown in FIG. 10, the information collected during a previous session may be displayed in a view similar to the view shown in FIG. 8. In an alternate embodiment the collected information on each cast may be displayed in a cast view shown in FIG. 11. The first two lines are equivalent to a fishing view shown in FIG. 8. In line three the number of the displayed cast is shown. The following two lines show as to whether a fish bite took place and as to whether the fish has been caught or lost. In the following line the length of the cast line 107 is displayed. By selecting the line below the currently displayed session can be deleted. By depressing the left button the next cast is selected. By depressing the middle button, the displayed previous session is continued. Depressing of the right button causes the microprocessor to display a menu view shown in FIG. 9.

In another embodiment more stages of deleting a session may be provided. If a fisherman deletes a session, this session is just marked that it will not be displayed to the fisherman. If, on the other hand, a special code is entered into the fishing counter, the deleted sessions can be recovered. This embodiment may provide an additional interface by which deleted sessions may be output. Such fishing counters may be used for charging fishing licenses depending on the number of fishing sessions, the total time of the fishing sessions and/or the number of caught fishes.

Instead of a microprocessor, a display and a keyboard a fishing counter may comprise a radio or infrared interface, for example a bluetooth or DECT radio interface. The evaluation of the reed-switch or light-barrier impulses might be done in a cellular phone nearby. Modern cellular phones comprise infrared and bluetooth interfaces for the communication with laptop computers. Moreover cellular phones often comprise a microprocessor which may provide the counter and clock functionality. This means that a counter, microprocessor, display and buttons are not necessary features.

Further modifications and variations of the present invention will be apparent to those skilled in the art in view of this description. Accordingly, this description is to be construed as illustrative only and is for the purpose of teaching those skilled in the art the general manner of carrying out the present invention. It is to be understood that the forms of the invention shown and described herein are to be taken as the presently preferred embodiments.

| | reference list |
|---|---|
| 1 | fishing rod |
| 2 | pole portion |
| 3 | handle portion |
| 4 | fishing counter |
| 5 | housing |
| 6 | spring |
| 7 | magnet |
| 8 | reed switch |
| 9 | printed circuit board |
| 10 | microprocessor |
| 11 | fastening |
| 12 | reel |
| 20 | fixed-spool reel |
| 21 | body |
| 22 | padded handle |
| 23 | rotor |
| 24 | magnet |
| 25 | reed switch |
| 26 | buttons |
| 27 | display |
| 28 | bail arm |
| 29 | bail |
| 30 | line roller |
| 31 | fixed spool |
| 32 | fishing line |
| 35 | display |
| 36 | buttons |
| 37 | magnet |
| 38 | reed switch |
| 39 | magnet |
| 40 | reed switch |
| 41 | closed-face reel |
| 42 | thumb button |
| 43 | thumb button in pressed position |
| 44 | light barrier |
| 45 | padded handles |
| 46 | crank arm |
| 47 | drag adjustment knob |

| | -continued |
|---|---|
| | reference list |
| 48 | magnet |
| 49 | reed switch |
| 50 | buttons |
| 51 | display |
| 52 | microprocessor |
| 53 | front cone |
| 54 | casing |
| 61 | multiplier reel |
| 62 | right-side housing |
| 63 | left-side housing |
| 64 | drag adjustment handle |
| 65 | padded handle |
| 66 | spool |
| 67 | line guide seat |
| 68 | line guide |
| 69 | clutch |
| 70 | clutch in pressed position |
| 71 | clutch magnet |
| 72 | clutch magnet, clutch in pressed position |
| 73 | clutch reed switch |
| 74 | spool magnet |
| 75 | spool reed switch |
| 76 | second spool magnet |
| 77 | second spool reed switch |
| 81 | baitcasting reel |
| 82 | left side plate |
| 83 | thumb bar |
| 84 | magnet |
| 85 | reed switch |
| 86 | CCD-array |
| 91 | present date |
| 92 | present time |
| 93 | session count |
| 94 | session time |
| 95 | cast count |
| 96 | bite count |
| 97 | fish count |
| 98 | cast line length |
| 99 | mean cast line length |
| 100 | menu |
| 101 | cursor line |
| 102 | menu item for switching to mean |
| 103 | menu item for switching to median |
| 104 | reel lifetime |
| 105 | battery lifetime |
| 106 | previous session view |
| 107 | cast line length of a previous cast |
| 108 | menu |

The invention claimed is:

1. A reel for a fishing rod comprising a fishing line and a bail arm configured to flip-back during casting of the fishing line, said bail arm comprising:
a sensor for detecting and registering the number of said flip-backs; and
a display for displaying the number of said flip-backs.

2. A reel for a fishing rod comprising a bail arm, said bail arm comprising:
a line roller; and
wherein said bail arm comprises a sensor for detecting rotations of said line.

3. The reel of claim 2 wherein said bail arm further comprises a microprocessor being suitably programmed to provide a counter functionality.

4. The reel of claim 3, wherein said microprocessor is further suitably programmed to provide a clock functionality for displaying at least one of the data of present date, present time, duration of present fishing session or number of casts during the present fishing session.

5. The reel of claim 4, wherein said microprocessor is further suitably programmed for calculating at least one of the data of length of cast line, mean length of the cast line of all casts during the present fishing session, median length of the cast line of all casts during the present fishing session, lifetime of the bail arm, lifetime of the reel, or lifetime of a battery.

6. The reel of claim 5, wherein said bail arm further comprises a display for displaying any of said data.

7. The reel of claim 6, wherein said microprocessor further comprises a memory for storing data of previous fishing sessions and the microprocessor is suitably programmed to display at least one of the data of length of the cast line of a previous cast, mean length of the cast line of all casts during a previous fishing session, median length of the cast line of all casts during a previous fishing session, duration of a previous fishing session, a list of previous sessions, number of fish bites during a session, number of caught fishes during a session, percentage of fish bites per cast during a session, percentage of caught fishes per cast during a session, whether a fish bite occurred during a cast of a previous session or whether a fish has been caught during a cast of a previous session.

8. The reel of claim 7 wherein said bail arm further comprises keys connected to the microprocessor for controlling operation of the microprocessor for performing at least one of the operations of switching on the microprocessor and the display, switching off the microprocessor and the display, starting a new fishing session, ending a fishing session, continuing a fishing session, or selecting data to be displayed.

* * * * *

UNITED STATES PATENT AND TRADEMARK OFFICE
CERTIFICATE OF CORRECTION

PATENT NO. : 7,523,882 B2 Page 1 of 1
APPLICATION NO. : 11/571307
DATED : April 28, 2009
INVENTOR(S) : Olavs Priednieks It is certified that error appears in the above-identified patent and that said Letters Patent is hereby corrected as shown below:

In column 10, line 57, please add after said line --roller--

Signed and Sealed this

Sixteenth Day of June, 2009

JOHN DOLL
*Acting Director of the United States Patent and Trademark Office*